US006771523B2

(12) United States Patent
Thereze et al.

(10) Patent No.: US 6,771,523 B2
(45) Date of Patent: Aug. 3, 2004

(54) CONVERTER SECONDARY CIRCUIT HAVING AN AUXILIARY OUTPUT

(75) Inventors: Jean-Marie Thereze, Lannion (FR); Didier Balocco, Lannion (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/359,221

(22) Filed: Feb. 6, 2003

(65) Prior Publication Data

US 2003/0147265 A1 Aug. 7, 2003

(30) Foreign Application Priority Data

Feb. 7, 2002 (FR) .......................................... 02 01498

(51) Int. Cl.[7] .......................................... H02M 7/217
(52) U.S. Cl. ................................................. 363/127
(58) Field of Search .......................... 363/21.06, 21.14, 363/44, 52, 67, 125, 127

(56) References Cited

U.S. PATENT DOCUMENTS 6,128,203 A * 10/2000 Canizales Teran ....... 363/21.06
6,297,970 B2 * 10/2001 Hemena et al. .......... 363/21.06
6,445,597 B1 * 9/2002 Boylan et al. ........... 363/21.06
6,459,600 B2 * 10/2002 Farrington et al. ........... 363/89
6,487,095 B1 * 11/2002 Malik et al. .................. 363/25
6,490,183 B2 * 12/2002 Zhang ......................... 363/89

FOREIGN PATENT DOCUMENTS

EP      0 954 088 A1    11/1999
EP      0 989 660 A2    3/2000

* cited by examiner

Primary Examiner—Adolf Berhane
(74) Attorney, Agent, or Firm—Sughrue Mion, PLLC

(57) ABSTRACT

The present invention relates to a converter secondary circuit having a main output (2) and an auxiliary output (7), the secondary circuit comprising a first synchronous rectifier that is self-controlled and generates a rectified voltage for the main output (2), and said auxiliary output including a second synchronous rectifier receiving at its input said rectified voltage and being regulated by an auxiliary regulation control circuit (8) having a synchronization input (8B). According to the invention, said synchronization input (8B) receives a synchronization signal which is at zero when said rectified voltage is not at zero.

7 Claims, 3 Drawing Sheets

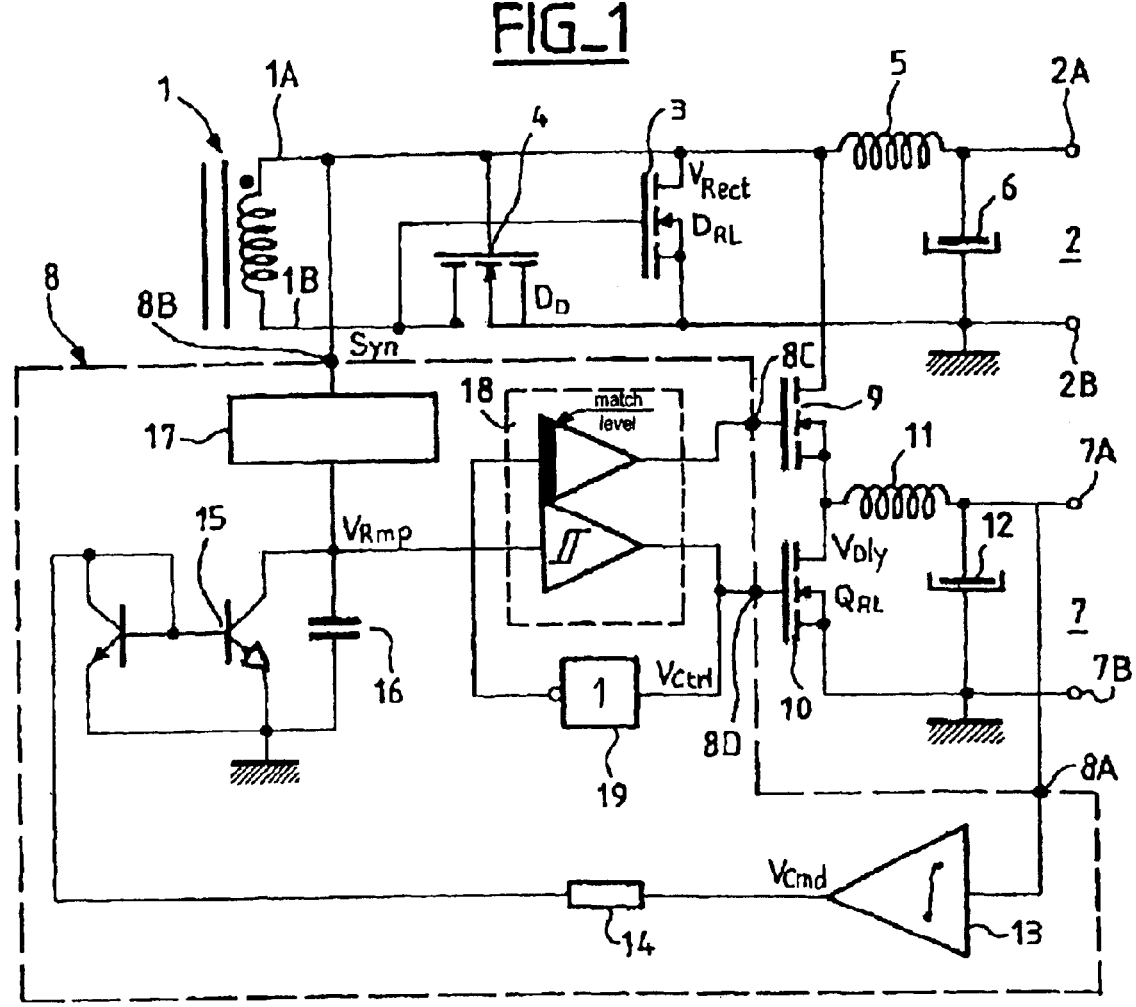
FIG_1
FIG_2A
FIG_2B

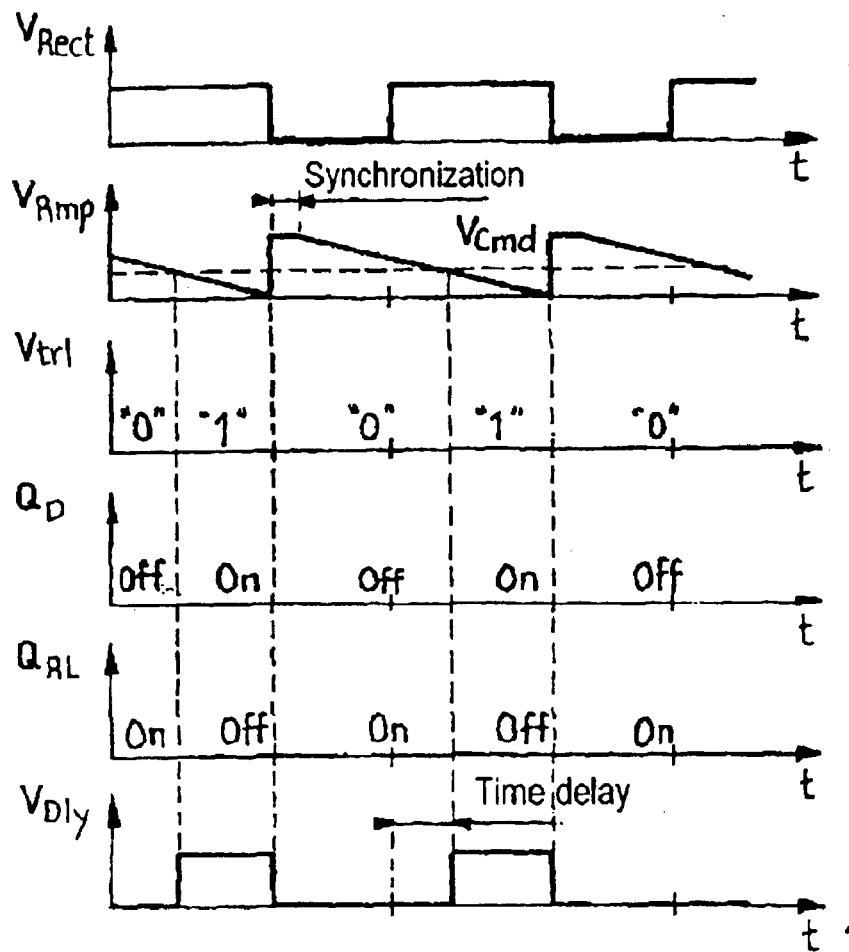
FIG_3
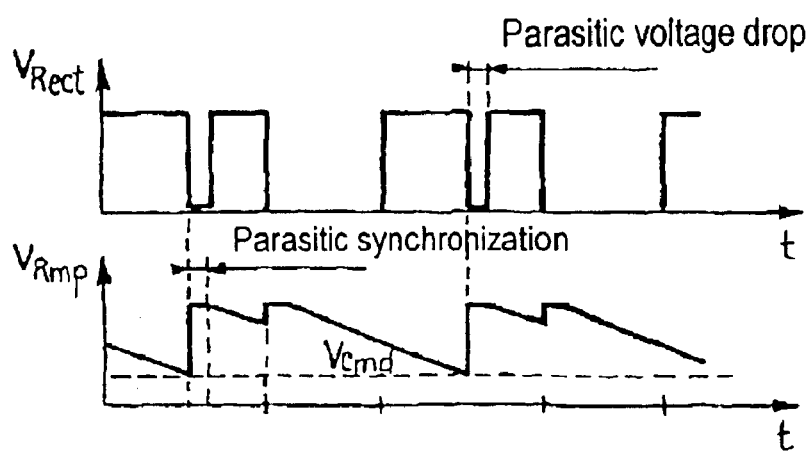
FIG_4

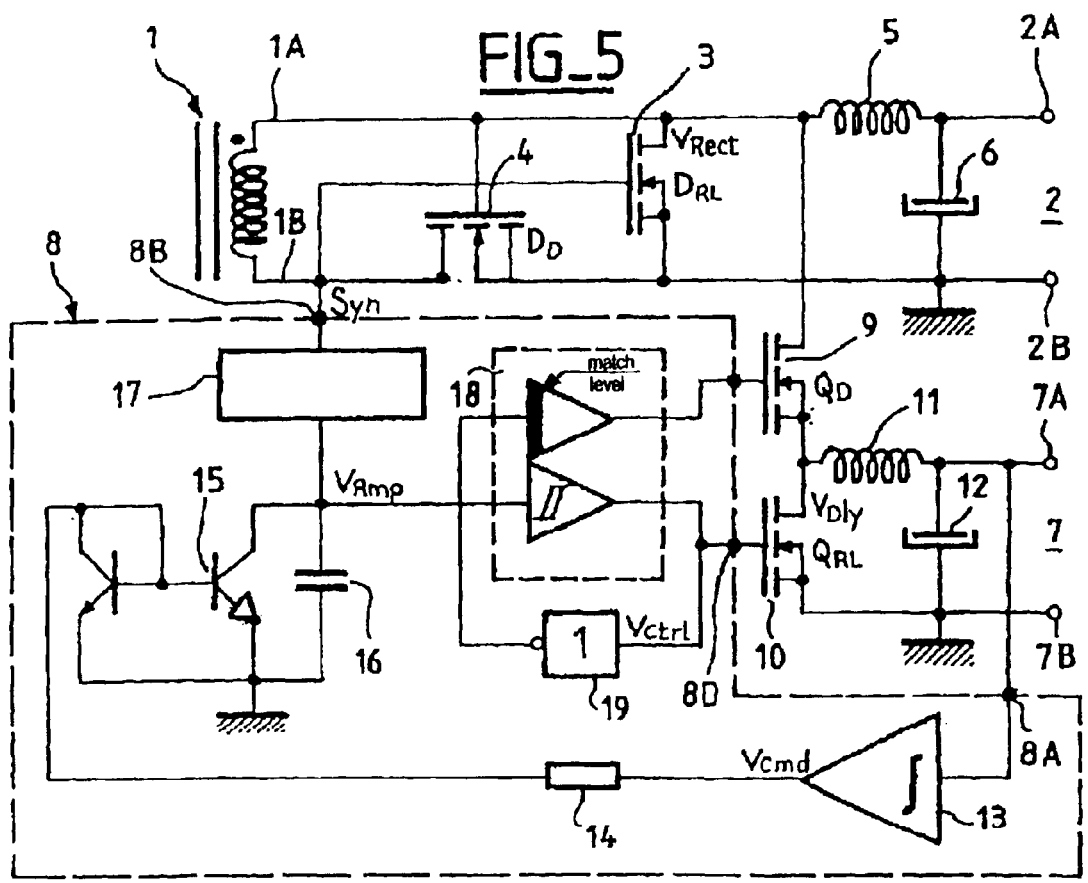
FIG_5
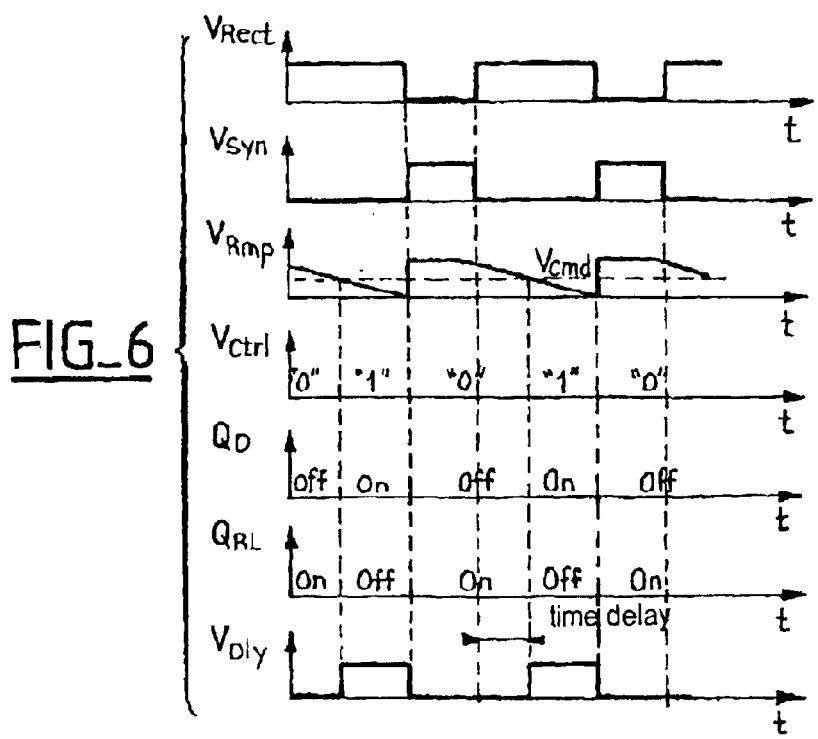
FIG_6

CONVERTER SECONDARY CIRCUIT HAVING AN AUXILIARY OUTPUT

The present invention relates to a converter secondary circuit having an auxiliary output.

BACKGROUND OF THE INVENTION

A converter usually receives electrical power from a power supply having an input voltage and delivers electrical power to a load at an output voltage. The voltage at the main output is regulated by the primary of the converter to guarantee that a constant voltage is applied to the load even if the input voltage and/or the output current vary. It is often desirable to add one or more auxiliary outputs, which must be regulated independently by a secondary circuit.

The patent document EP 0 954 088 describes a secondary circuit for a converter having a main output and an auxiliary output. That converter comprises:
- a first synchronous rectifier which is self-controlled, that generates a first rectified voltage for the main output and receives at its input a voltage supplied by a first transformer, and
- a second synchronous rectifier that generates a second rectified voltage for said auxiliary output and that receives at its input a voltage supplied by a second transformer whose primary is the choke for filtering the first rectified voltage.

The second synchronous rectifier is controlled by an auxiliary regulation control circuit having two terminals connected to respective terminals of the secondary of the first transformer to synchronize the second rectifier.

FIG. 1 shows a converter secondary circuit with a main output, described in patent document EP 0 618 666.

An AC signal from the primary is present at the terminals 1A and 1B of the transformer 1. This signal is rectified by a rectifier and filtered by a filter to obtain the required DC voltage at the terminals 2A and 2B of the main output 2.

The self-controlled synchronous rectifier comprises a freewheel MOSFET 3 and a direct MOSFET 4 and the filter is an LC circuit 5, 6. Synchronous rectification using MOSFETs considerably reduces losses. The gate of the freewheel transistor 3 is connected to the terminal 1B of the transformer 1 and the gate of the direct transistor 4 is connected to the terminal 1A of the transformer 1. Because of these connections, switching of the transistors 3 and 4 is automatically synchronized with the primary circuit.

The above kind of converter secondary circuit can be provided with an auxiliary output 7.

FIG. 1 shows a prior art auxiliary output circuit.

The auxiliary output 7 also has a controlled synchronous rectifier consisting of a direct MOSFET 9 and a freewheel MOSFET 10 and a filter consisting of an LC circuit 11, 12 and is regulated by an auxiliary regulation control circuit 8.

The auxiliary regulation control circuit 8 has a control input 8A connected to the terminal 7A of the auxiliary output 7, a synchronization input 8B connected to the terminal 1A of the transformer 1, and two outputs 8C and 8D connected to the gates of the transistors 9 and 10, respectively.

The auxiliary regulation control circuit creates a time-delay for controlling the energy transmitted on each switching cycle. This time-delay is a function of the control voltage $V_{Cmd}$.

To avoid the need for a bidirectional switch, it is the unidirectional voltage $V_{Rect}$ after rectification in the secondary circuit that feeds the auxiliary output 7 via the MOSFETs 9 and 10 and the LC filter 11, 12.

FIG. 3 shows the theoretical waveforms of the signals in the above kind of circuit.

The voltage at the drain of the direct transistor 9 is the voltage $V_{Rect}$ rectified by the secondary circuit. An integrator converts the output voltage into a DC voltage $V_{Cmd}$ and, by comparison with a voltage ramp $V_{Rmp}$, a binary signal $V_{Ctrl}$ is obtained that controls the turning on and off of the transistors 9 and 10, as shown by the graphs $Q_D$ and $Q_{RL}$. The resulting voltage $V_{Dly}$ is therefore shifted by a particular time-delay before it is filtered to obtain the voltage at the auxiliary output 7.

The means used to achieve this are known in the art and are explained in more detail in the description given hereinafter.

The voltage ramp $V_{Rmp}$ is synchronized to the voltage at the terminal 1A of the transformer 1 and therefore to voltage $V_{Rect}$.

This represents the ideal operation. In reality, on each switching of the direct transistor 9 of the auxiliary output synchronous rectifier, an unwanted voltage drop occurs in the rectified voltage $V_{Rect}$, as shown in FIG. 4. This unwanted voltage drop leads to parasitic synchronization of the voltage ramp $V_{Rmp}$ and to poor operation of the circuit, the output voltage falling and the converter ceasing to function.

One solution would be to add a filter to cancel this parasitic effect. However, the overall efficiency of the converter would then decrease because of the time-delay introduced by the filter. Moreover, if the auxiliary output current is too high, a filter of that kind is no longer effective.

OBJECTS AND SUMMARY OF THE INVENTION

The invention solves this problem and, to do so, proposes a converter secondary circuit having a main output and an auxiliary output, the secondary circuit comprising a synchronous rectifier which is self-controlled and generates a-rectified voltage for the main output and said auxiliary output including a second synchronous rectifier which receives at its input said rectified voltage and is controlled by an auxiliary regulation control circuit having a synchronization input, which circuit is characterized in that said synchronization input receives a synchronization signal which is at zero when said rectified voltage is not at zero.

If the first synchronous rectifier consists of a main MOSFET and a freewheel MOSFET, the gate of the freewheel transistor is connected to a terminal of a transformer at a synchronization point, said synchronization input of said auxiliary regulation control circuit is connected to the secondary circuit, and said synchronization input is connected to said synchronization point.

Said synchronization input is advantageously connected in the auxiliary regulation control circuit to a rising edge detector, a falling edge detector or a level detector.

Said second synchronous rectifier preferably consists of a direct MOSFET and a freewheel MOSFET.

BRIEF DESCRIPTION OF THE DRAWINGS

The invention is described in more detail hereinafter with the assistance of figures showing a preferred embodiment of the invention.

FIG. 1 shows a prior art converter secondary circuit described in the patent document EP 0 618 666.

FIGS. 2A and 2B show part of the same circuit as FIG. 1.

FIG. 3 is a set of diagrams illustrating the ideal operation of the circuit shown in FIG. 1.

FIG. 4 is a set of diagrams illustrating the real operation of the circuit shown in FIG. 1.

FIG. 5 shows a converter secondary circuit according to the invention.

FIG. 6 is a set of diagrams illustrating the operation of the circuit shown in FIG. 5.

MORE DETAILED DESCRIPTION

The secondary circuit of the transformer 1 shown in FIG. 1 or FIG. 5 has a main output 2 and an auxiliary output 7. It includes a self-controlled synchronous rectifier consisting of a freewheel MOSFET 3, a direct MOSFET 4 and a filter consisting of an LC circuit 5, 6. The gate of the freewheel transistor 3 is connected to the terminal 1B of the transformer 1, at which it is synchronized to a synchronization point Syn, and the gate of the transistor 4 is connected to the terminal 1A of the transformer 1.

This kind of converter secondary circuit has an auxiliary output 7. The auxiliary output 7 also has a controlled synchronous rectifier consisting of a direct MOSFET 9, a freewheel MOSFET 10 and a filter consisting of an LC circuit 11, 12, and is regulated by an auxiliary regulation control circuit 8.

In the prior art shown in FIG. 1, the auxiliary regulation control circuit 8 has a control input 8A connected to the terminal 7A of the auxiliary output 7, a synchronization input 8B connected to the terminal 1A of the transformer, and two outputs 8C and 8D connected to the gates of the transistors 9 and 10, respectively.

The auxiliary regulation control circuit 8 includes:

a corrector network consisting of an integrator 13 connected to the input 8A and whose output signal $V_{Cmd}$ is a DC voltage, a resistor 14, a current mirror 15 shunted by a capacitor 16 which is charged or discharged at a constant current to form a voltage ramp $V_{Rmp}$, a detector 17 for fast charging or discharging of the capacitor 16, also connected to the synchronization input 8B, and a half-bridge control circuit 18 looped with a switch 19 and leading to the outputs 8C and 8D of the auxiliary regulation control circuit 8.

Two types of detectors 17 can be used, and are shown in FIGS. 2A and 2B.

The detector 17 can be a voltage level detector to determine the moment at which the rectified voltage $V_{Rect}$ is equal to zero, and can consist of a MOSFET 17A whose gate is connected to the input 1A of the transformer 1, whose source is connected to a positive voltage supply and whose drain is connected to the capacitor 16.

The detector 17 can be a differentiator circuit and can consist of a bipolar transistor 17B controlled to set the voltage of the capacitor 16 and a resistor 17C in series with a capacitor 17D. The capacitor 17D is connected to the input 1A of the transformer 1 and the transistor 17B is connected to the capacitor 16.

The operation of a circuit of the above kind is described next with reference to the FIG. 3 diagrams.

In a first step, the time-delay is created. When the voltage at the terminals of the transformer is positive, the ramp voltage $V_{Rmp}$ begins to fall. The ramp voltage is compared to the threshold of the half-bridge control circuit 18. The control signal $V_{Cmd}$ sets the slope of the ramp voltage $V_{Rmp}$ via the current mirror 15 and the resistor 14. So long as the ramp voltage $V_{Rmp}$ is above the threshold, the circuit generates the time-delay. During the time-delay, the direct transistor 9 is off and the freewheel transistor 10 is on.

In a second step, energy is transferred. When the ramp voltage $V_{Rmp}$ reaches the threshold, the freewheel transistor 10 is turned off and the main transistor 9 is turned on. There is transfer of energy to the output 7 for as long as the voltage of the transformer 1 is positive.

In a third step, the freewheel transistor 3 is turned on and the transistor 4 is turned off. The detector 17 is activated in order to synchronize the auxiliary regulation circuit 8. When the voltage of the transformer 1 becomes negative, the freewheel transistor 10 is turned on again and the direct transistor 9 is turned off. During this step, the circuit is synchronized using a voltage from the transformer 1. To this end, the ramp voltage $V_{Rmp}$ is set at a value above the threshold by a voltage supply.

According to the invention, and as shown in FIG. 5, the synchronization input 8B is connected to the control point Syn of the freewheel transistor 3 of the secondary circuit.

Instead of taking the rectified voltage $V_{Rect}$ directly as the synchronization reference, as in the prior art, the gate voltage of the freewheel transistor 3 is used. Because this voltage signal is present when the rectified voltage $V_{Rect}$ is zero, as shown in the FIG. 6 diagrams, the parasitic effects of the switching of the direct transistor 9 of the secondary circuit of the auxiliary output are avoided.

The detector 17 can then be of the type previously described with reference to FIGS. 2A and 2B. Generally speaking, it can be a rising edge detector, a falling edge detector or a level detector.

What is claimed is:

1. A converter secondary circuit having a main output (2) and an auxiliary output (7), the secondary circuit comprising:

a first synchronous ectifier (3, 4) which is self-controlled and generates a first rectified voltage ($V_{Rect}$) for the main output (2), and a second synchronous rectifier (9, 10) which generates a second rectified voltage for said auxiliary output (7A), said second synchronous rectifier being controlled by an auxiliary regulation control circuit (8) having a synchronization input (8B), which circuit is characterized in that the second synchronous rectifier receives at its input said first rectified voltage ($V_{Rect}$) and said synchronization input (8B) receives a synchronization signal (Syn) which is at zero whe said first rectified voltage ($V_{Rect}$) is not at zero.

2. A circuit according to claim 1, wherein said first synchronous rectifier consists of a main MOSFET (4) and a freewheel MOSFET (3), the gate of the freewheel transistor (3) is connected to a terminal (1B) of a transformer (1) at a synchronization point (Syn), and said synchronization input (8B) of said auxiliary regulation control circuit (8) is connected to the secondary circuit, which circuit is characterized in that said synchronization input (8B) is connected to said synchronization point (Syn).

3. A circuit according to claim 2, characterized in that said synchronization input (8B) is connected in the auxiliary regulation control circuit (8) to a rising edge detector (17).

4. A circuit according to claim 2, characterized in that said synchronization input (8B) is connected in the auxiliary regulation control circuit (8) to a falling edge detector (17).

5. A circuit according to claim 2, characterized in that said synchronization input (8B) is connected in the auxiliary regulation control circuit (8) to a level detector (17).

6. A circuit according to claim 1, characterized in that said second synchronous rectifier consists of a direct MOSFET (9) and a freewheel MOSEET (10).

7. The circuit according to claim 2, wherein said synchronization input (8B) is connected directly to said synchronisation point and said transformer terminal (1B).

* * * * *